T. SCHIMPER.
FRAMES FOR POCKET-BOOKS.
No. 187,779. Patented Feb. 27, 1877.
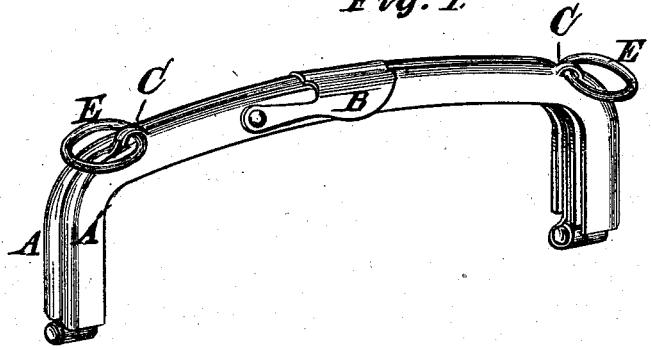
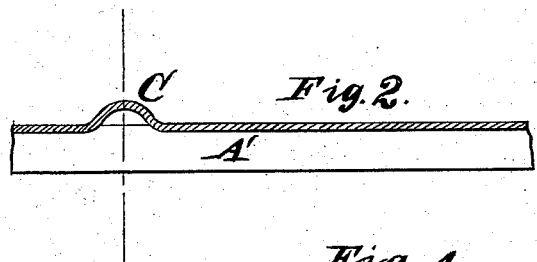
Witnesses
John Becker.
Fred Haynes
Theodore Schimper
by his Attorneys
Brown & Allen

UNITED STATES PATENT OFFICE.

THEODORE SCHIMPER, OF NEW YORK, N. Y.

IMPROVEMENT IN FRAMES FOR POCKET-BOOKS.

Specification forming part of Letters Patent No. 187,779, dated February 27, 1877; application filed January 17, 1877.

*To all whom it may concern:*

Be it known that I, THEODORE SCHIMPER, of the city, county, and State of New York, have invented an Improvement in Frames of Pocket-Books, Portemonnaies, Bags, Satchels, and Purses; and I do hereby declare that the following is a full, clear, and exact description of the same, reference being had to the accompanying drawing, forming part of this specification.

My invention relates to the eyes of such frames used for the attachment of chains, cords, or handles to the frames.

Hitherto such eyes have been made separately, and attached to the frames by soldering them onto the surface of, or inserting them in holes formed in, such frames, and securing them in such holes by soldering or riveting.

My invention consists in a frame having the eyes for the attachment of the chain or handle cut and struck up from, and forming part of, the frame itself, as hereinafter described.

My improvement can be carried out in the regular manufacture of such frames at a cost of about one-twentieth of that required for the separate manufacture of the eyes, and their subsequent attachment to the frame, and at the same time I secure a stronger and more durable eye than the eyes separately made and subsequently attached.

Figure 1 in the drawing represents a portemonnaie-frame with the eyes formed in and of the frame itself according to my invention. Figs. 2, 3, and 4 are detail views, illustrating the method of carrying out my invention.

A and A' represent the hinged parts of the frame; B, the clasp which holds said parts closed; C, the eyes formed in one of the bows A' of the frame, and E the handle-rings inserted through the eyes C, as shown in Fig. 1. The eyes C are formed by a punch or punches, which, at a single stroke, cut two parallel cuts at a distance asunder equal to the width of the eye shown in transverse section in Figs. 3 and 4, and at the same time stretches or draws the metal between the said cuts sufficiently to form the eye, but without materially weakening its attachment to the frame.

The invention is applicable to frames of portemonnaies, pocket-books, bags, and satchels of all kinds employing such frames, whether such frames are of rectangular cross-section, as shown in Fig. 4, or of rounded cross-section, as shown in Fig. 3.

The eyes thus made are very much cheaper and stronger than those hitherto employed.

I claim—

The frame A A', having the eyes C cut and struck up from, and forming part of, the frame itself, substantially as and for the purpose specified.

THEODORE SCHIMPER.

Witnesses:
MICHAEL RYAN,
FRED. HAYNES.